United States Patent [19]

Phelps

[11] 4,373,697
[45] Feb. 15, 1983

[54] PULSE WIDTH MODULATED CONSTANT CURRENT SERVO DRIVER

[75] Inventor: Weldon L. Phelps, Dunlap, Ill.

[73] Assignee: Caterpillar Tractor Co., Peoria, Ill.

[21] Appl. No.: 275,074

[22] PCT Filed: Dec. 29, 1980

[86] PCT No.: PCT/US80/01751
§ 371 Date: Dec. 29, 1980
§ 102(e) Date: Dec. 29, 1980

[87] PCT Pub. No.: WO82/02236
PCT Pub. Date: Jul. 8, 1982

[51] Int. Cl.³ .............................................. F16K 31/02
[52] U.S. Cl. .................................. 251/129; 137/487.5
[58] Field of Search ................. 137/14, 487.5, 625.65; 251/129

[56] References Cited

U.S. PATENT DOCUMENTS 3,455,536  7/1969  Barker ........................... 251/129 X Primary Examiner—Gerald A. Michalsky
Attorney, Agent, or Firm—Krass & Young

[57] ABSTRACT

A method and apparatus for controlling a coil (40) operated hydraulic valve (48) employs a constant current source (36) to consistently control valve response ($P_o$) irrespective of variations in power supply voltage and coil resistance ($R_c$). A switching circuit (58) controls the delivery of constant current pulses from the current source (36) to the coil (40) in accordance with a series of pulse width modulated control signals whose duty factors ($t_1/t_2$) are proportionate to preselected values of hydraulic output pressures ($P_o$) developed by the valve (48). A voltage regulator circuit (38) provides regulated supply voltage to the constant current source (36) in order to reduce variations in the coil current ($I_c$) at small pulse widths.

3 Claims, 7 Drawing Figures

PULSE WIDTH MODULATED CONSTANT CURRENT SERVO DRIVER

TECHNICAL FIELD

This invention generally relates to servo controlled hydraulic valves of the type operated by an electrically responsive coil, and deals more particularly with a method and apparatus for consistently controlling valve response irrespective of variations in power supply voltage and coil resistance.

BACKGROUND ART

Control systems often employ servo controlled hydraulic valves to control hydraulic line pressure. For example, one application of a servo controlled hydraulic valve is for controlling differentially driven wheel slip in vehicles. Wheel slip is controlled by selectively activating the vehicle's hydraulically operated brakes in a manner which directs braking power to the slipping wheel or wheels. An electrical control system senses wheel slippage and produces pulse width modulated control signals whose duty factors are proportional to the desired response of a hydraulic proportioning valve. The proportioning valve is in turn connected to a control valve which controls the pressure of hydraulic fluid applied to the brakes.

Servo controlled valves of the type mentioned above include an electrically responsive coil for controlling an output of the valve. These coils are selectively energized with a suitable voltage source for time periods corresponding to the periods of the control signals. As will be discussed more fully hereinafter, substantial variations in valve response are experienced as a result of changes in both power supply voltage and the resistance of the coil due to temperature variations. In some cases, valve response, which may be measured in terms of the magnitude of hydraulic output pressure from the valve, may vary considerably. This pressure variation significantly reduces the accuracy of a control system employing servo valves and may prevent their use in some applications.

The present invention is directed to overcoming the problems associated with the prior art discussed above and provides a significantly improved pulse width modulated servo driver which affords consistently repeatable valve response.

DISCLOSURE OF THE INVENTION

According to one aspect of the invention, an improved apparatus for controlling a coil operated hydraulic valve is responsive to pulse width modulated control signals for producing hydraulic output pressures respectively proportionate to the duty factors of the control signals. A constant current source is employed in order to consistently control valve response irrespective of variations in power supply voltage and coil resistance. A switching circuit controls the delivery of constant current pulses to the coil in accordance with the control signals, and a voltage regulator circuit provides regulated supply voltage to the constant current source in order to reduce variations in the coil current at small pulse widths.

According to another aspect of the invention, a method is provided for operating a servo controlled hydraulic valve having a coil operated output for producing preselected, hydraulic output pressures, which substantially eliminates variance in the output pressures due to changes in the magnitude of voltage supplied to the coil or changes in the resistance of the coil due to the effects of temperature or the like. The method includes the steps of: producing control signals having duty factors respectively proportionate to the preselected hydraulic pressures; generating a plurality of current pulses of substantially constant magnitude using the control signals; and, delivering the current pulses to the coil. The current pulses are delivered to the coil by: sensing the control signals; operating a switching circuit using sensed control signals; and, controlling the operation of a constant current source using the switching circuit. Additionally, the method may include the steps of: generating a supply of electrical power; regulating the voltage of the power supply; and, delivering the voltage regulated power to the constant current source.

BEST MODE FOR CARRYING OUT THE INVENTION

Figure 1:
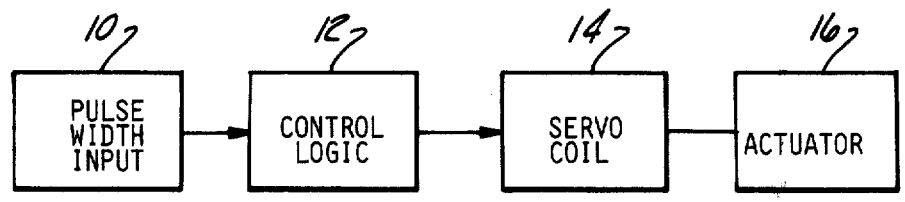
FIG. 1 is a block diagram of a known system for controlling a hydraulic valve.
Figure 2:
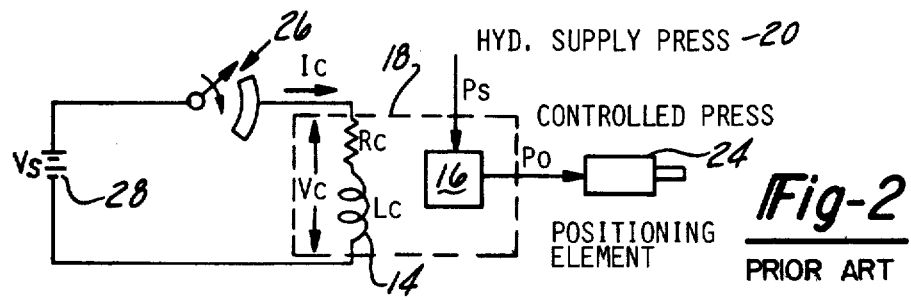
FIG. 2 is a combined schematic and block diagram of the servo driver employed in the system shown in FIG. 1.
Figure 3:
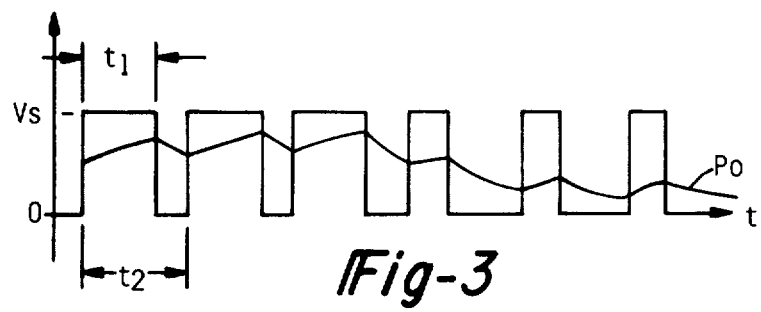
FIG. 3 is a waveform diagram of the voltage input to the coil of the servo driver shown in FIG. 2, as well as the pressure output from the valve.

The import of the present invention may best be understood by a thorough understanding of known servo drivers for hydraulic valves, and in this connection reference is made to FIGS. 1–3. A pulse width input 10 typically includes an oscillator (not shown) operating in combination with a duty cycle generator (not shown) which produces a width modulated pulse train at a preselected frequency. This pulse train is selectively delivered by control logic 12, which may comprise a microprocessor based system, to the coil 14 of a servo valve 18. Coil 14, having an inductance of $L_c$ and a resistance of $R_c$ is effectively connected in series with a suitable source of voltage $V_s$, designated by the numeral 28, as well as the control logic 12, which, for purposes of simplicity, has been indicated as a rotary switch 26 in FIG. 2.

Switch 26 effectively couples the voltage source 28 with the servo valve 18, thereby applying a voltage $V_c$ across the coil 14. The duration for which the voltage $V_c$ is present across the servo valve 18 corresponds to the width of the pulse produced by switch 26. The voltage $V_c$ applied to the valve 18 by switch 26 causes coil 14 to operate a valve actuator 16 in proportion to the duty factors of the voltage pulses $V_c$ applied to the coil 14. Valve actuator 16 has an input coupled to a supply of hydraulic pressure $P_s$ designated by the numeral 20 and an output which delivers controlled hydraulic pressure $P_o$ to a mechanical positioning element 24. Positioning element 24, in turn, may be employed to operate a proportioning valve (not shown) or the like. Thus, it may be appreciated that the output pressure $P_o$ is directly proportional to the width or period of the voltage pulses generated by switch 26.

The relationship between the pulse width modulated signals developed by the arrangements shown in FIGS. 1 and 2 and the output pressure $P_o$ of servo valve 18 can be better understood by reference to FIG. 3, wherein the duty factor of the pulse width modulated signal, indicated by $t_1/t_2$ is less than the period $t_2$ of such signal. When the duty factor $t_1/t_2$ of the pulse width modulated signal is shorter in time than the time constant of the servo valve 18, the output pressure $P_o$ is averaged as is apparent from the waveform and is proportional to the average current flow through coil 14, i.e., $$P_o = K I_{c(avg)} \qquad (1)$$

The average current $I_{c(avg)}$ is a also a function of the duty factor $t_1/t_2$, the voltage $V_c$ applied across the coil 14, and the resistance $R_c$ of the coil 14.

Thus, $$I_{c(avg)} = D_F(V_c/R_c) \qquad (2)$$

Where:

$$D_F = t_1/t_2$$

Combining equations (1) and (2) yields:

$$P_o = K D_F(V_c/R_c) \qquad (3)$$

Clearly then, the magnitude of the output pressure $P_o$ is directly dependent upon the magnitude of the voltage $V_c$ as well as the resistance $R_c$ of the coil 14.

Hydraulic servo valves are often employed in applications where supply voltage and ambient temperature may vary widely. Considering the foregoing equations, a substantial change in the magnitude of supply voltage $V_s$ results in a proportionate change in the output pressure $P_o$. Additionally, changes in the ambient temperature produce a direct change in the resistance $R_c$ of the coil 14. Again, variance of the resistance $R_c$ produces a proportional change in the output pressure $P_o$. These changes in supply voltage $V_s$ and coil resistance $R_c$ can result in a variation of the output pressure $P_o$ which is as much as ±50% of the maximum output pressure $P_o$.

Figure 4:
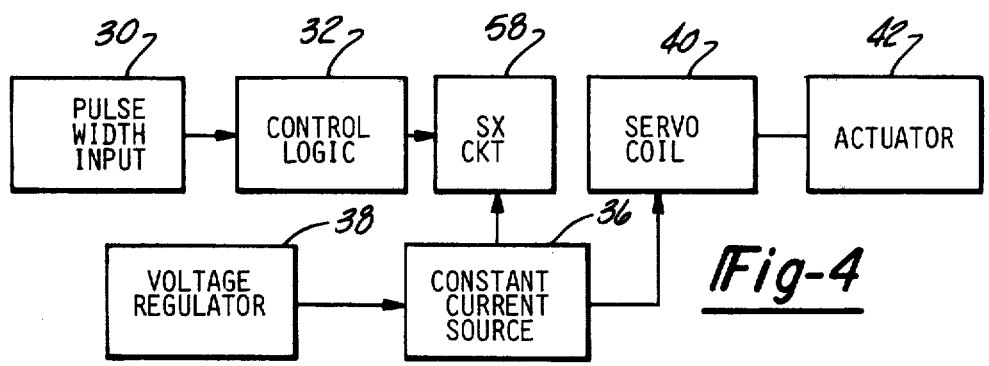
FIG. 4 is a block diagram of a system for controlling a hydraulic valve including a pulse width modulated constant current, servo driver which forms the preferred embodiment of the present invention.

Referring generally now to FIGS. 4-7, the present invention provides a pulse width modulated, constant current, servo driver which eliminates variations in the output pressure $P_o$ due to changes in power supply voltage or temperature, thus assuring a constant proportional relationship between the output pressure $P_o$ and the pulse width of the control signal. As seen in FIG. 4, the servo driver of the present invention is adapted for use with a conventional pulse width input 30 and control logic 32 which are similar in construction to those previously discussed. The width modulated pulse train output from control logic 32 is delivered to the input of a switching circuit 58. The switching circuit 58 provides a means for controlling the output of a constant current source 36 and is operative to deliver constant current pulses, having duty factors respectively corresponding to the signals output by control logic 32, from the current source 36 to the servo coil 40 of a servo valve 48. A voltage regulator 38 provides a constant voltage input to the current source 36. Coil 40 is operative to energize a valve actuator 42, which in turn controls a mechanical positioning element 46.

Figure 5:
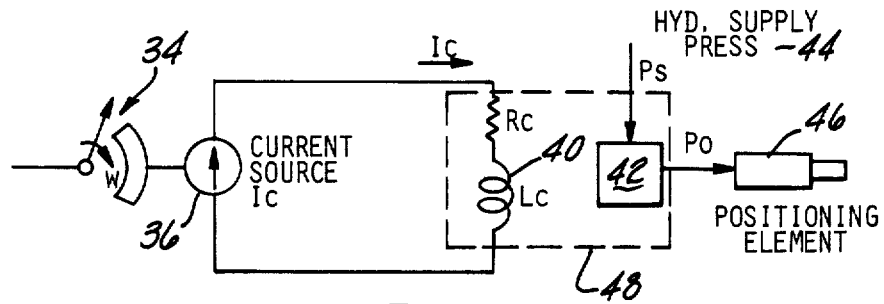
FIG. 5 is a combined block and schematic diagram of the servo driver employed in the system shown in FIG. 4.
Figure 6:
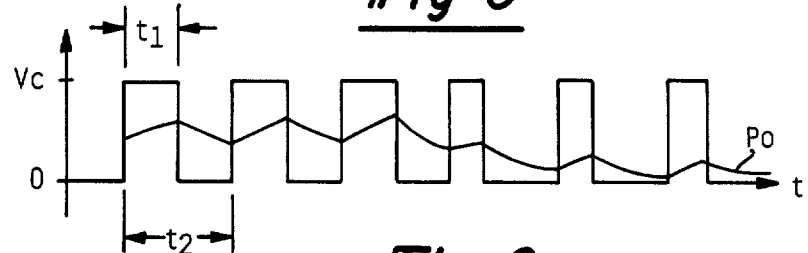
FIG. 6 is a waveform diagram showing the current input and pressure output respectively, of the servo driver and valve shown in FIG. 5; and, FIG. 7 is a detailed schematic diagram of the servo driver shown in FIG. 5.

Turning attention particularly to FIGS. 5 and 6, the servo coil 40 includes an inductance $L_c$ and a resistance $R_c$ connected in series with the constant current source 36 which delivers current $I_c$ through the coil 40. The output of the current source 36 is controlled by the switching circuit 34 which effectively gates the current $I_c$ to produce a series of constant current pulses having duty factors $t_1/t_2$ equivalent to those output by control logic 32.

Energization of the valve actuator 42 during each current pulse is proportional to the duty factor $t_1/t_2$ of the current pulse flowing through coil 40, and results in the delivery of hydraulic fluid from a hydraulic pressure supply 44 to the positioning element 46 at a proportionate output pressure $P_o$.

From FIG. 6, it can be seen that the average current $I_{c(avg)}$ flowing through coil 40 is given by the formula:

$$I_{c(avg)} = (t_1/t_2)I_c = D_F I_c \qquad (4)$$

Substituting equation (4) into equation (1) gives:

$$P_o = K D_F I_c$$

Thus, by applying constant current pulses to the servo valve 48, the output pressure $P_o$ becomes independent of variations in the supply voltage or coil resistance $R_c$.

Figure 7:
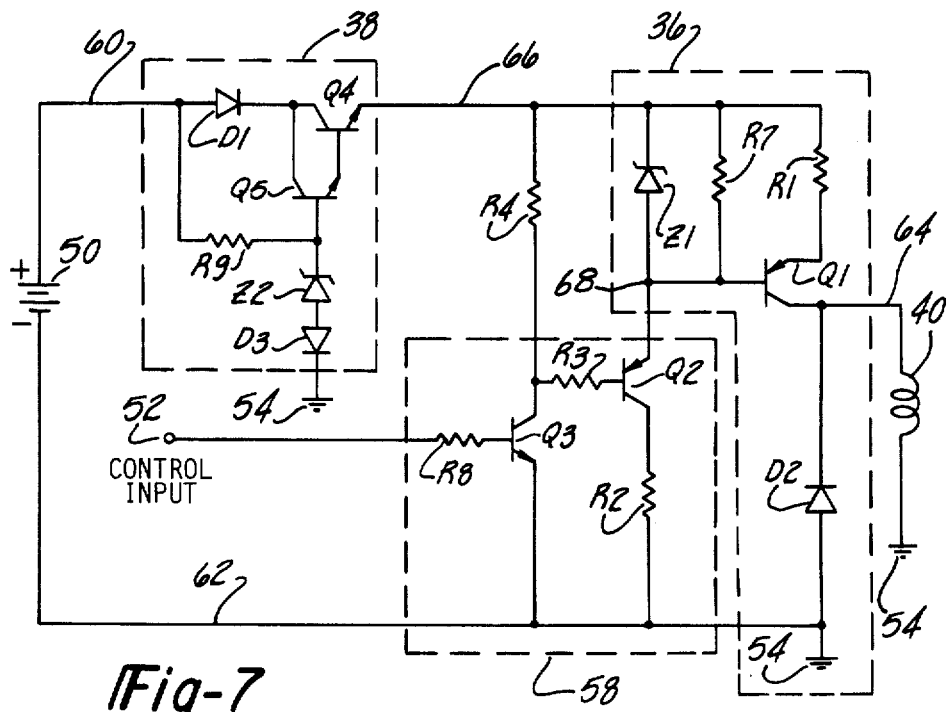

Referring now to FIG. 7, the servo driver of the present invention includes a suitable power source such as the battery 50 respectively coupled by lines 60 and 62 to the input of a voltage regulator, generally indicated within the broken line 38, and ground 54. The voltage regulator 38 comprises a diode D1 coupled between line 60 and the collectors of a pair of Darlington connected transistors Q4 and Q5. The base of transistor Q5 is connected to line 60 through resistor R9 and to ground 54 through zener diode Z2 and diode D3. A regulated supply of voltage is output from regulator 38 to the switching circuit 58 via resistor R4 as well as to the constant current source, generally indicated within the broken line 36, via line 66.

Pulse width modulated control signals derived from control logic 32 (FIG. 4) are delivered to switching circuit 58 via control input 52. Switching circuit 58 includes an input transistor Q3 and an output transistor Q2. Transistor Q3 has the base thereof coupled through resistor R8 to control input 52 while the collector to emitter path thereof is connected between the output of voltage regulator 38 through resistor R4 and ground 54. The base of transistor Q2 is connected through resistor R3 to the collector of transistor Q3. The collector to emitter path of transistor Q2 is connected between ground 54 through resistor R2 and terminal 68 which forms a switching input to the constant current source 36.

The constant current source 36 includes a transistor Q1 whose base is connected to terminal 68 as well as to the output of the voltage regulator 38 through resistor R7 and zener diode Z1. The emitter of transistor Q1 is connected via resistor R1 to line 66. The collector of transistor Q1 is coupled in series with diode D2 to ground 54. The collector of transistor Q1 also forms the output of current source 36 and is coupled by line 64 to ground 54 through the coil 40.

The switching circuit 58 switches or "gates" the output of current source 36 on line 64 between on and off states in accordance with leading and trailing edges of the pulse width modulated control signals received at control input 52. The leading edge of a pulse received on control input 52 turns on transistor Q3, which in turn renders transistor Q2 conductive. When transistor Q2 is on, transistor Q1 turns on and the voltage developed across zener diode Z1 is equal to the sum of the current $I_c$ flowing through line 64 times the resistance $R_1$ plus the voltage drop between the base and emitter of transistor Q1, i.e., $$I_c R_1 + V_{BEQ1} = V_{Z1}$$

or, $$I_c = (V_{Z1} - V_{BEQ1})/R_1$$

Since the voltage developed across zener diode Z1 as well as the base to emitter voltage of transistor Q1 each remains constant and, further, since the value of resistor R1 does not change, it can be readily appreciated that the current pulse $I_c$ remains constant in magnitude, irrespective of variations in the resistance of the coil 40, or the voltage of the power supply 50, so long as the voltage of the power supply 50 remains in a range capable of being regulated by voltage regulator 38.

At the end of the control pulse, transistors Q2 and Q3 are turned off, which in turn shuts off transistor Q1 to terminate the flow of current $I_c$.

The voltage regulator 38 is employed in connection with the preferred form of the invention to reduce variation in the current $I_c$ flowing through coil 40 in response to control pulses having especially short periods, since the inductance of the coil 40 affects the rate that current $I_c$ rises following the leading edge of the control pulse.

From the foregoing, it can be appreciated that the present invention provides a novel method of operating a servo controlled hydraulic valve which substantially eliminates variance in the output pressure of the valve due to changes in the magnitude of voltage supplied to the coil or changes in the resistance of the coil. The method includes the steps of: producing a plurality of control signals which have duty factors respectively proportionate to preselected hydraulic pressures; generating a plurality of current pulses of substantially constant magnitude using the control signals; and, delivering the current pulses to the coil. Current pulses are delivered to the coil by sensing the control signals, operating a switching circuit using the sensed control signals, and then controlling the operation of the constant current source using the switching circuit.

INDUSTRIAL APPLICABILITY

The constant current servo driver of the present invention is well adapted for a number of applications. However, the servo driver of the present invention is particularly well suited for those applications where wide fluctuations in power supply voltage and temperature may be experienced, as in vehicles for example. The present servo driver is compatible with various types of control circuits which produce pulse train signals wherein the duty factors of the signals are proportional to preselected servo responses.

It will be appreciated by those skilled in the art that although a preferred embodiment of the constant current servo driver has been depicted in connection with the foregoing description, other suitable circuits may be successfully employed in practicing the invention. Other aspects, objects and advantages of this invention can be obtained from a study of the drawings, disclosure and the appended claims.

I claim:

1. In an apparatus for controlling an hydraulic servo valve (48) having a coil (40) operated output (42) responsive to control signals for producing hydraulic output pressures ($P_o$) respectively proportionate to the duty factors ($t_1/t_2$) of said control signals, and means (30, 32) for producing said control signals, the improvement comprising:
   a DC voltage supply (50) such as a battery which is subject to variations in output voltage level;
   regulator means (38) connected to the supply (50) to provide a regulated voltage;
   a constant current generator circuit (36) connected to receive the regulated voltage for producing a current output constant magnitude which is substantially independent of variations in the voltage from said supply (50);
   and variable duty cycle switch means (58) interconnecting the constant current generator circuit (36) with the coil (40) to apply current pulses of constant magnitude but variable duration to the coil (40).

2. An apparatus, as set forth in claim 1, wherein said means (36) for supplying a plurality of current pulses includes an electrical transistor (Q1).

3. An apparatus, as set forth in claim 2, wherein a base of said electrical transistor (Q1), which is connected to said controlling means (58) for supplying a plurality of current pulses includes a diode (Z1) and a resistor (R1) respectively connected with the base and an emitter of said transistor (Q1).

* * * * *